US012158718B2

(12) United States Patent
Suzuki et al.

(10) Patent No.: US 12,158,718 B2
(45) Date of Patent: Dec. 3, 2024

(54) FIXING APPARATUS INCLUDING A HEATER WITH A PLURALITY OF ELECTRODES AND CORRESPONDING ELECTRICAL CONTACTS LOCATED IN AN INNER SPACE OF A FILM

(71) Applicant: Canon Kabushiki Kaisha, Tokyo (JP)

(72) Inventors: Takafumi Suzuki, Shizuoka (JP); Kazushi Nishikata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/479,868

(22) Filed: Oct. 3, 2023

(65) Prior Publication Data

US 2024/0027943 A1 Jan. 25, 2024

Related U.S. Application Data

(60) Division of application No. 17/846,473, filed on Jun. 22, 2022, now Pat. No. 11,809,111, which is a (Continued)

(30) Foreign Application Priority Data

May 26, 2020 (JP) ................................ 2020-091436

(51) Int. Cl.
*G03G 15/20* (2006.01)
*G03G 15/00* (2006.01)

(52) U.S. Cl.
CPC ..... *G03G 15/2053* (2013.01); *G03G 15/2064* (2013.01); *G03G 15/80* (2013.01)

(58) Field of Classification Search
USPC .......................................................... 399/328
See application file for complete search history.

(56) References Cited

U.S. PATENT DOCUMENTS 6,122,478 A 9/2000 Hirst
9,519,252 B2 12/2016 Tateishi et al.
(Continued)

FOREIGN PATENT DOCUMENTS

CN 104656402 A 5/2015
EP 0241714 A1 10/1987
(Continued)

OTHER PUBLICATIONS

Extended European Search Report issued on Sep. 22, 2021 in counterpart European Patent Appln. No. 21175604.4.
(Continued)

*Primary Examiner* — Quana Grainger
(74) *Attorney, Agent, or Firm* — Venable LLP

(57) ABSTRACT

A fixing apparatus according includes: a heater that includes a substrate, a heating element provided on the substrate, and an electrode provided on the substrate and electrically connected to the heating element; and a power supply member that includes a first member bonded or coupled to the electrode to supply power to the heating element and a second member bonded or coupled to an opposite surface of the first member to a surface, which is bonded or coupled to the electrode, of the first member, wherein the heater generates heat by power supplied via the power supply member, and an image formed on a recording material is heated by heat of the heater; and a liner expansion coefficient of the first member is different from a liner expansion coefficient of the second member.

3 Claims, 13 Drawing Sheets

Related U.S. Application Data continuation of application No. 17/330,609, filed on May 26, 2021, now Pat. No. 11,397,395.

(56) References Cited

U.S. PATENT DOCUMENTS

| | | | |
|---|---|---|---|
| 2016/0132009 A1 | 5/2016 | Yashiro et al. | |
| 2016/0216659 A1 | 7/2016 | Ikegami et al. | |
| 2020/0166885 A1* | 5/2020 | Yamada | G03G 15/2042 |
| 2020/0192260 A1 | 6/2020 | Suzuki et al. | |

FOREIGN PATENT DOCUMENTS

| | | | |
|---|---|---|---|
| EP | 1174775 | A1 | 1/2002 |
| JP | S54126863 | U | 9/1979 |
| JP | 04351877 | A | 12/1992 |
| JP | H0652972 | A | 2/1994 |
| JP | H06052972 | A | 2/1994 |
| JP | 1145019 | A | 2/1999 |
| JP | 2000172099 | A | 6/2000 |
| JP | 2002015839 | A | 1/2002 |
| JP | 2002216938 | A | 8/2002 |
| JP | 2002299009 | A | 10/2002 |
| JP | 2002299016 | A | 10/2002 |

OTHER PUBLICATIONS

Japanese Office Action issued Feb. 20, 2024 in counterpart Japanese Patent Appln. No. 2020-091436.
Chinese Office Action issued on Jan. 24, 2024 in counterpart Chinese Patent Appln. No. 202110568746.2.
European Office Action issued on Apr. 16, 2024 in counterpart European Patent Appln. No. EP 21175604.4.
Korean Office Action dated Sep. 23, 2024 in counterpart Korean Patent Appln. No. 10-2021-0067023.

* cited by examiner

FIXING APPARATUS INCLUDING A HEATER WITH A PLURALITY OF ELECTRODES AND CORRESPONDING ELECTRICAL CONTACTS LOCATED IN AN INNER SPACE OF A FILM

CROSS-REFERENCE TO RELATED APPLICATIONS

The present application is a Division of U.S. patent application Ser. No. 17/846,473 filed on Jun. 22, 2022, which is a Continuation of U.S. patent application Ser. No. 17/330,609 filed on May 26, 2021, now U.S. Pat. No. 11,397,395 B2 issued Jul. 26, 2022, which claims the benefit of Japanese Patent Application No. 2020-091436, filed on May 26, 2020, which are both hereby incorporated by reference herein in their entireties.

BACKGROUND OF THE INVENTION

Field of the Invention

The present invention relates to a fixing apparatus in an image forming apparatus such as a printer or a copying machine.

Description of the Related Art

Image fixing apparatus employing a film heating method, excellent in on-demand property have been widely used as an image fixing apparatus included in an image forming apparatus such as a copying machine or a laser beam printer. Such an image fixing apparatus employing the film heating method includes a heater that serves as a heating source, a supporting member that supports the heater, a heat-resistant heating film, and a pressure roller (pressure member). The heater supported by the supporting member and the pressure roller form a nip portion that sandwiches the heating film. While a recording material is nipped and conveyed by the nip portion formed with the pressure roller and the heating film, an unfixed toner image on the recording material is heated and fixed. The heater has a configuration in which a heating element on a substrate generates heat when power is supplied to the heating element on the substrate from an electrode on the substrate via a conductor on the substrate. The power is supplied to the electrode from a commercial alternating-current power supply through a power supply member.

In Japanese Patent Application Publication No. H04-351877, an electrode on a substrate and a power supply member are ultrasonically bonded to improve reliability of the power supply member in a high-temperature environment.

SUMMARY OF THE INVENTION

However, in the above conventional example, intermittent use of the image fixing apparatus causes thermal stress to repeatedly occur in the power supply member due to heating and cooling. Specifically, the substrate of the heater thermally expands in accordance with the linear expansion coefficient of material thereof, and this causes the electrode to thermally expand to the same extent. Likewise, the power supply member also thermally expands in accordance with the linear expansion coefficient of material thereof. Thus, with the configuration in the above conventional example, when the linear expansion coefficients of the substrate and the power supply member greatly differ, thermal stress occurs in the ultrasonically bonded power supply member due to the difference in linear expansion coefficient between both of these components and an increase in temperature during use.

Further, with an increase in print speed in recent years, the temperature of the heater tends to be increased to maintain thermal energy applied to recording materials. This causes even greater thermal stress to occur in the power supply member. Repeated occurrence of this thermal stress may cause the power supply member to be detached from the image fixing apparatus. In addition, as in the above conventional example, when the substrate is made of ceramic, which is a fragile material, and the power supply member is made of metal, since the metal has a greater linear expansion coefficient than the ceramic, a force acts in a direction in which the ceramic is pulled. Therefore, fatigue is more easily accumulated in the ceramic, and this may reduce the lifetime of the ceramic.

With the foregoing in view, it is an object of the present invention to reduce the repeated thermal stress applied to a power supply member and improve the reliability of the power supply member.

In order to achieve the object described above, a fixing apparatus according to the present invention includes:

- a heater that includes a substrate, a heating element provided on the substrate, and an electrode provided on the substrate and electrically connected to the heating element; and
- a power supply member that includes a first member bonded or coupled to the electrode to supply power to the heating element and a second member bonded or coupled to an opposite surface of the first member to a surface, which is bonded or coupled to the electrode, of the first member, wherein
- the heater generates heat by power supplied via the power supply member, and an image formed on a recording material is heated by heat of the heater; and
- a liner expansion coefficient of the first member is different from a liner expansion coefficient of the second member.

According to the present invention, the repeated thermal stress applied to the power supply member can be reduced and the reliability of the power supply member can be improved. Further features of the present invention will become apparent from the following description of exemplary embodiments with reference to the attached drawings.

DESCRIPTION OF THE EMBODIMENTS

Hereinafter, preferred exemplary embodiments for implementing the present invention will be described in detail with reference to the drawings. However, sizes, materials, shapes, relative positions, etc. of the components described in the embodiments are to be appropriately changed in accordance with the configuration and various conditions of an apparatus to which the present invention is applied, and the scope of the present invention is not limited to the following embodiments.

Embodiment 1

1. Overall Configuration of Image Forming Apparatus

Figure 2:
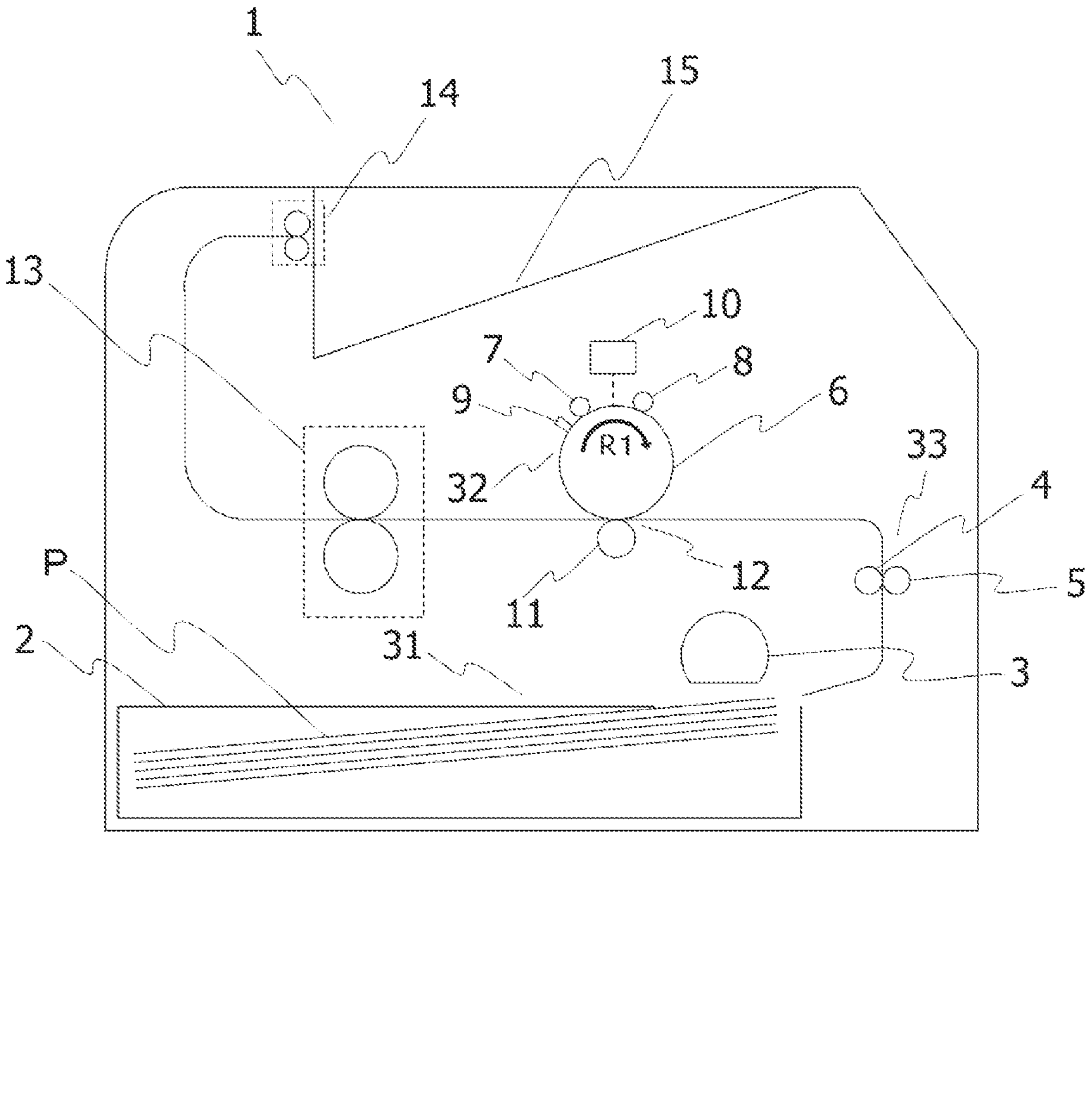
FIG. 2 is a schematic cross-sectional view of an image forming apparatus according to Embodiment 1.

First, an overall configuration of an image forming apparatus according to the present embodiment will be described with reference to FIG. 2. FIG. 2 is a schematic cross-sectional view of an image forming apparatus 1 including an image fixing apparatus 13. The image forming apparatus 1 used in the present embodiment is a laser beam printer employing an electrophotographic method.

The image forming apparatus 1 includes a recording material feeding portion 31 that feeds a recording material P and an image forming portion 32 that forms an image on the recording material P. In the recording material feeding portion 31, the recording materials P loaded in a cassette 2 are picked up one by one from the topmost recording material P by a sheet feeding roller 3 and conveyed to a registration portion 33. The registration portion 33 includes a registration roller 4 and a registration roller 5. After being aligned in a conveying direction at the registration portion 33, the recording material P is fed to the image forming portion 32.

The image forming portion 32 includes a photosensitive drum 6 that serves as an image bearing member, a charging device 7 that charges the photosensitive drum 6, a developing device 8 that develops a latent image on the photosensitive drum 6 with toner, and a cleaner 9 that removes residual toner on the photosensitive drum 6. The photosensitive drum 6 is driven to rotate in a direction of an arrow R1. The charging device 7 uniformly charges a peripheral surface of the photosensitive drum 6. A laser scanner 10 serving as exposure means is placed above the image forming portion 32 in a vertical direction. The laser scanner 10 irradiates the charged photosensitive drum 6 with a laser beam based on image information to form an electrostatic latent image on the photosensitive drum 6. The electrostatic latent image formed on the photosensitive drum 6 is developed to be a toner image by the developing device 8.

Next, the developed toner image is transferred onto a recording material P that passes through a transfer portion 12 including a transfer roller 11 and the photosensitive drum 6. The recording material P on which the toner image has been transferred is conveyed to the image fixing apparatus 13. The toner image on the recording material P is heated and fixed by the image fixing apparatus 13. The recording material P having passed through the image fixing apparatus 13 is discharged onto a recording material stacking portion 15 provided on the upper side of the image forming apparatus 1 in the vertical direction by a sheet discharging roller pair 14.

2. Image Fixing Device

Figure 3:
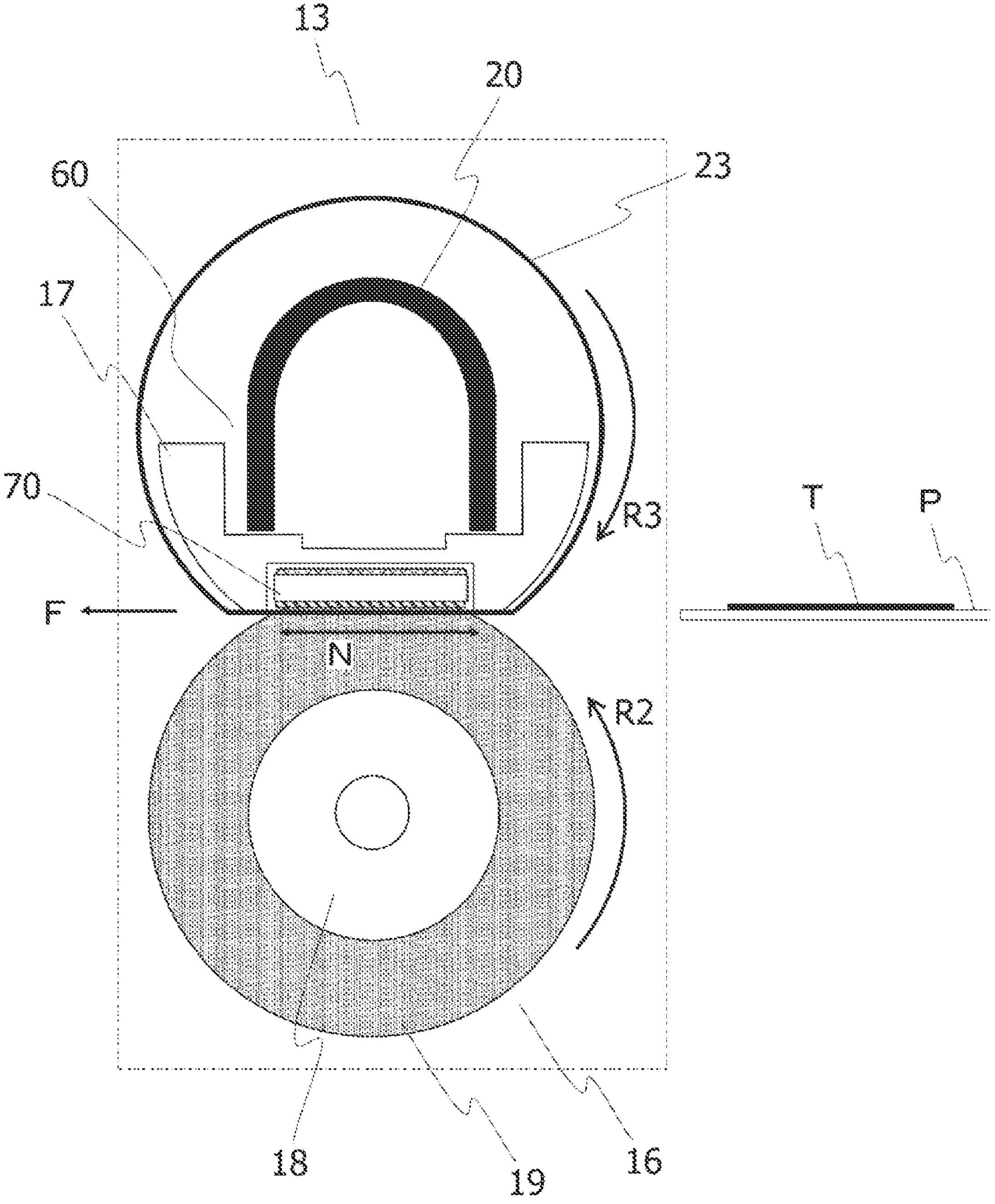
FIG. 3 is a cross-sectional view of an image fixing apparatus in a conveying direction of a recording material according to Embodiment 1.

The image fixing apparatus 13 of the present embodiment will be described. FIG. 3 is a cross-sectional view of the image fixing apparatus 13 taken in a conveying direction F of the recording material P. The image fixing apparatus 13 will be described with reference to FIG. 3. The image fixing apparatus 13 is an image heating apparatus employing a pressure roller drive method, in which a pressure roller 16 is driven to rotate and a heating film 23 is rotated by the conveyance force of the pressure roller 16, and a film heating method.

The image fixing apparatus 13 includes the pressure roller 16, the tubular heating film (fixing film) 23, and a heater unit 60. The pressure roller 16 comes into contact with the outer peripheral surface of the heating film 23. The heater unit 60 includes a pressure stay 20, a heater 70 that serves as a heating member, and a heater holder 17 that serves as a supporting member supporting the heater 70. The heater unit 60 is placed inside the heating film 23 that comes into contact with the recording material P, while being in contact with the inner surface of the heating film 23. The heater 70 is placed in the internal space of the heating film 23. The heater 70 is supported by the heater holder 17, and the pressure roller 16 is placed on the opposite side of the heater 70, sandwiching the heating film 23.

The pressure stay 20 that transmits a pressing force to the pressure roller 16 formed with a core shaft portion 18 and a heat-resistant elastic layer 19 is placed inside the heating film 23. The heating film 23, which is a tubular flexible member, covers the outside of the heater holder 17, the heater 70, and the pressure stay 20. In addition, the heater holder 17 is biased toward the rotation axis of the pressure roller 16 via the pressure stay 20 by a spring (not illustrated) or the like. This forms a predetermined width of a fixing nip (nip portion) N between the heating film 23 and the pressure roller 16. In this way, the pressure roller 16 forms, together with the heater 70, the fixing nip N that nips and conveys the recording material P via the heating film 23. That is, the fixing nip N that nips and conveys the recording material P via the heating film 23 is formed by the heater 70 and the pressure roller 16.

The image fixing apparatus 13 drives the pressure roller 16 to rotate in a counterclockwise direction (a direction of an arrow R2) by a drive source (not illustrated), and the heating film 23 is rotated in a clockwise direction (a direction of an arrow R3) by the rotation of the pressure roller 16. The image fixing apparatus 13 conveys the recording material P bearing a toner image T. In this conveying process, the heat of the heating film 23 heated by the heater 70 and the pressure of the fixing nip N are applied to the recording material P so that the toner image T is fixed on the surface of the recording material P.

3. Heater and Heater Holder

Figure 4:
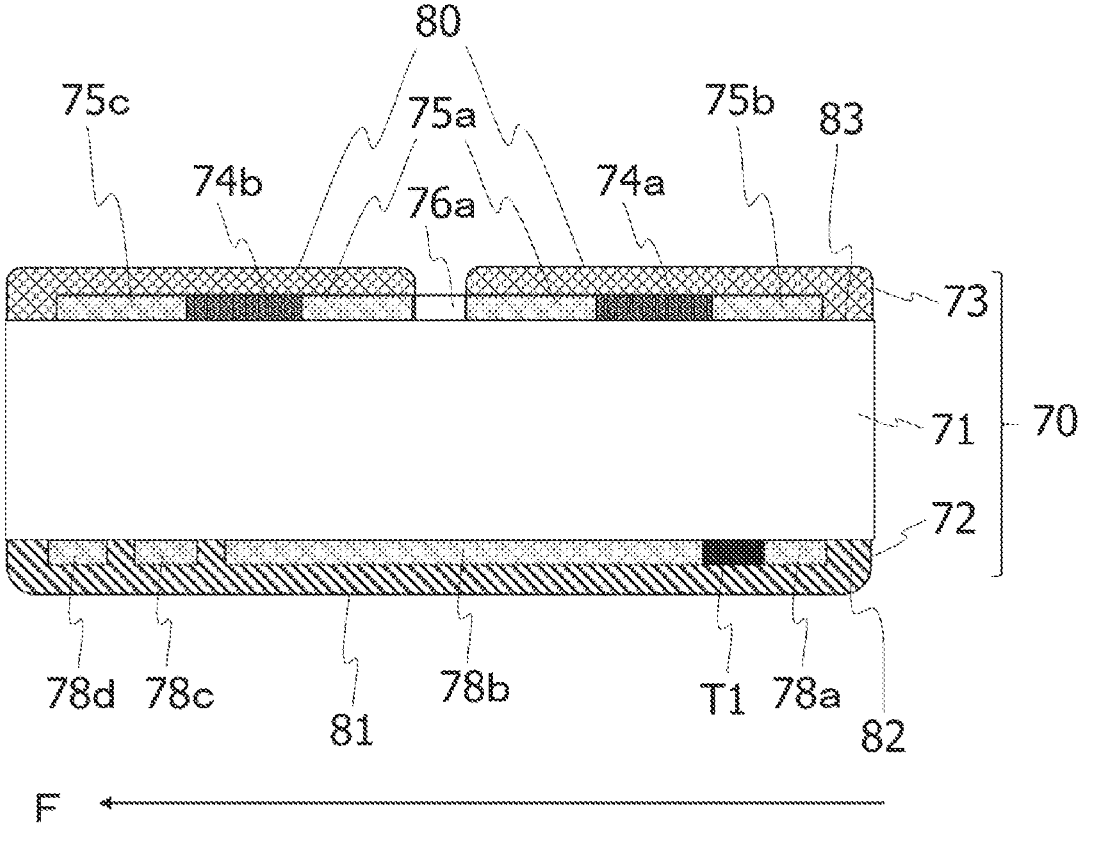
FIG. 4 is a cross-sectional view of a center part of a heater according to Embodiment 1.

The heater 70 and the heater holder 17 of the present embodiment will be described. FIG. 4 is a cross-sectional view of the center part of the heater 70. FIGS. 5A to 5E are plan views illustrating an example of a configuration of the heater 70 and the heater holder 17. FIG. 4 corresponds to a cross-sectional view taken along a conveyance reference position X0 in FIGS. 5A to 5E.

As illustrated in FIG. 4, the heater 70 has a layered configuration including a sliding surface layer 72, a substrate 71, and a rear surface layer 73. A thermistor T1 and conductors 78*a* to 78*d* serving as temperature detection portions are provided on a sliding surface (front surface) 82 of the substrate 71. Heating elements 74*a* and 74*b*, conductors 75*a* to 75*c*, and power supply electrode 76*a* are provided on a rear surface 83 of the substrate 71. The heating element 74*a* is provided at an upstream side in the conveying direction F of the recording material P, and the heating element 74*b* is provided at a downstream side in the conveying direction F of the recording material P on the rear surface 83 of the substrate 71.

The conductors 75*b* and 75*a* are arranged so as to sandwich the heating element 74*a*. Likewise, the conductors 75*a* and 75*c* are arranged so as to sandwich the heating element 74*b*. A heater circuit is configured such that the heating element 74*a* generates heat by supplying power between the conductors 75*b* and 75*a*, and likewise, the heating element 74*b* generates heat by supplying power between the conductors 75*a* and 75*c*. A cross-sectional structure is formed such that a protective glass 80 covers the rear surface 83 of the substrate 71. More specifically, the protective glass 80 covers the heating elements 74*a* and 74*b* and the conductors 75*a* to 75*c* while the power supply electrode 76*a* is exposed from the protective glass 80. That is, the rear surface layer 73 including the heating elements 74*a* and 74*b*, the conductors 75*a* to 75*c*, and the protective glass 80 is provided on the rear surface 83 of the substrate 71. In addition, a cross-sectional structure is formed such that a protective glass 81 covers the thermistor T1 and the conductors 78*a* to 78*d*. That is, the sliding surface layer 72 including the thermistor T1, the conductors 78*a* to 78*d*, and the protective glass 81 is provided on the sliding surface 82 of the substrate 71.

Figure 5A:
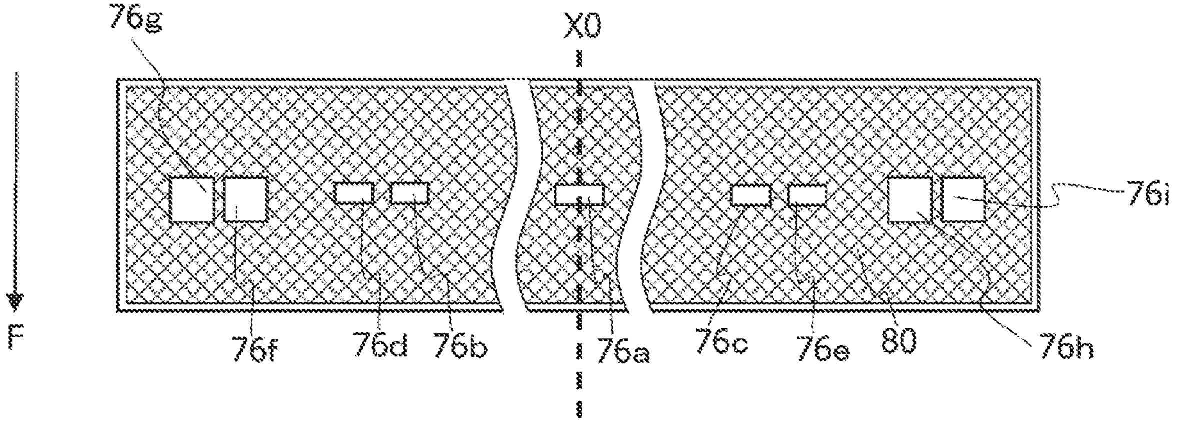
FIGS. 5A to 5E are plan views illustrating an example of a configuration of the heater and a heater holder according to Embodiment 1.
Figure 5B:
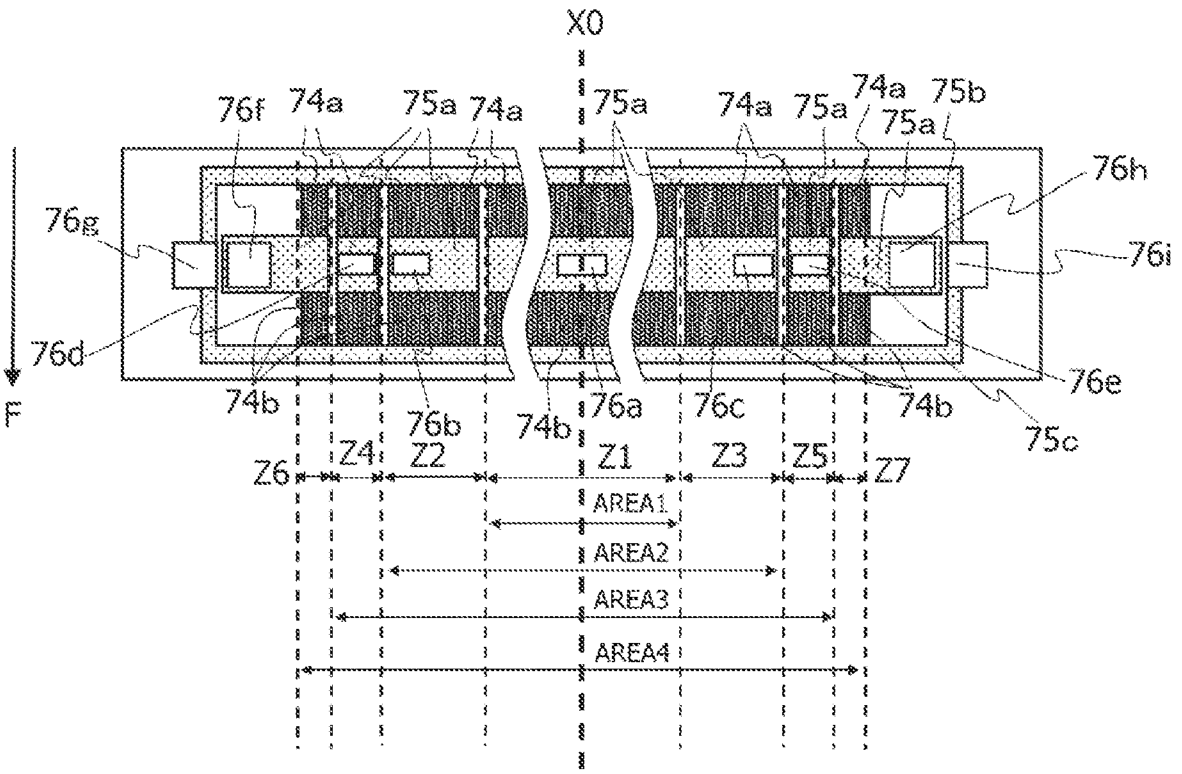
Figure 5C:
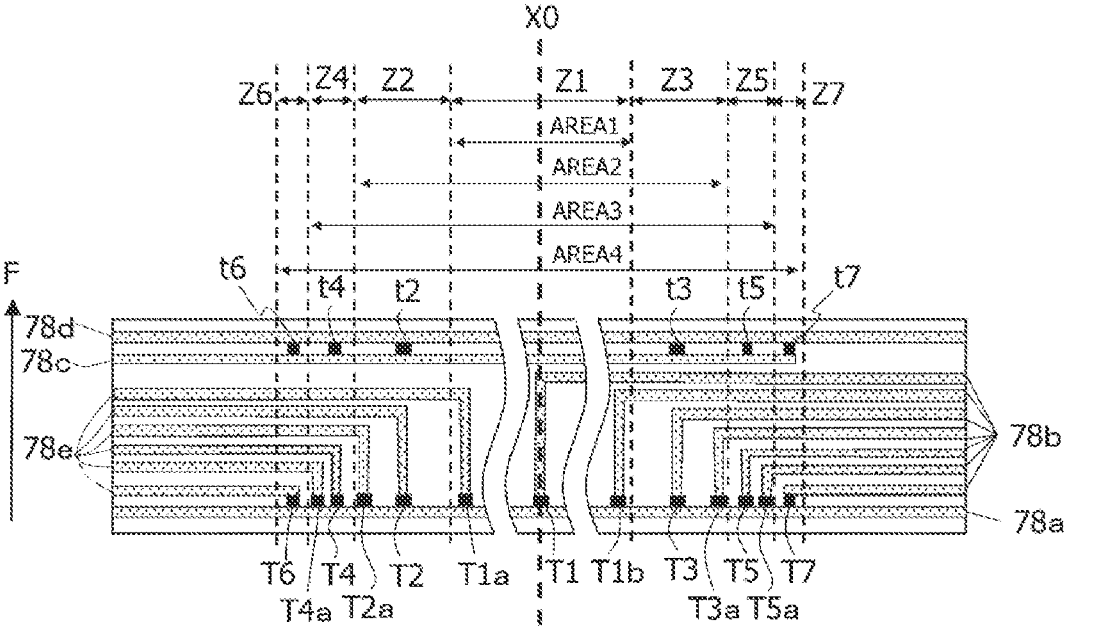
Figure 5D:
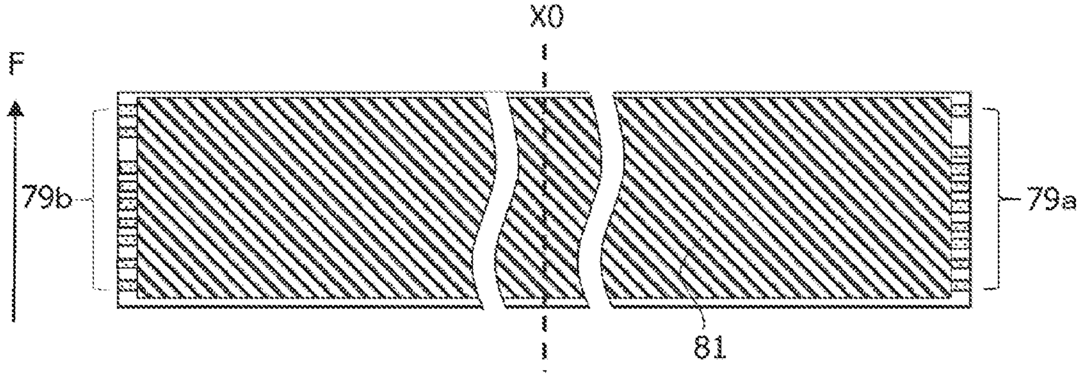

A planar configuration of each layer of the heater 70 will be described with reference to FIGS. 5A to 5E. FIGS. 5A and 5B are plan views of the heater 70 viewed from the rear surface layer 73 side. FIG. 5A is the plan view of the heater 70 viewed from above the protective glass 80. FIG. 5B is the plan view of the heater 70 without the protective glass 80. FIGS. 5C and 5D are plan views of the heater 70 viewed from the sliding surface layer 72 side. FIG. 5D is the plan view of the heater 70 viewed from above the protective glass 81. FIG. 5C is the plan view of the heater 70 without the protective glass 81. An arrow direction F illustrated on the left side of each diagram represents the conveying direction of the recording material P.

As illustrated in FIG. 5B, the rear surface layer 73 of the heater 70 is provided with seven heating blocks in the longitudinal direction each including a set of the conductor 75*b* on the upstream side, the conductor 75*a* in the center, the conductor 75*c* on the downstream side, the heating element 74*a* on the upstream side, the heating element 74*b* on the downstream side, and the power supply electrode 76. These seven heating blocks are denoted by Z1 to Z7 in FIG. 5B. Further, as illustrated in FIG. 5A, the protective glass 80 is formed, except for the area where the power supply electrodes 76*a* to 76*i* are arranged. That is, the power supply electrodes 76*a* to 76*i* are exposed from the protective glass 80. This configuration enables power supply members, which are characteristic to the present embodiment, to be bonded from the rear surface side of the heater 70. Thus, power can be independently supplied to the individual heating blocks, and by independently controlling the power supply via a control circuit (not illustrated), the heat generation of each heating block can be independently controlled. Further, dividing into seven heating blocks allows to form four heat generation distributions in the heater 70 as illustrated in FIGS. 5B and 5C as AREA 1 to AREA 4. As a result, four sheet passing areas corresponding to the four heat generation distributions can be formed in the heater 70. In the present embodiment, AREA 1 is classified as a sheet passing area for A5 paper, AREA 2 is classified as a sheet passing area for B5 paper, AREA 3 is classified as a sheet passing area for A4 paper, and AREA 4 is classified as a sheet passing area for letter-size paper.

By independently controlling the seven heating blocks, the heating block to be supplied with power can be selected in accordance with the size of the recording material P. Thus, no excess heat is applied to the non-sheet passing area. The length of the heat generation area and the number of the heating blocks are not limited to the length and the number described in the present embodiment. In addition, the heating elements 74*a* and 74*b* in each of the heating blocks are not limited to the continuous pattern as described in the present embodiment, and a strip-shaped pattern with a predetermined interval may be used. In the present embodiment, the power supply electrodes 76*g* and 76*f* arranged on the left-side end portion of the heater 70 in FIG. 5B form a first electrode group, and the power supply electrodes 76*h* and 76*i* arranged on the right-side end portion of the heater 70 in FIG. 5B form a second electrode group.

Thermistors T1 to T7 and thermistors T1*a*, T1*b*, T2*a* to T5*a*, t2 to t7 are arranged in the sliding surface layer 72 of the heater 70 for detecting a temperature of each heating block of the heater 70. The thermistors T1 to T7 are mainly used for controlling temperatures (controlling to maintain temperatures constant) of the respective heating blocks and arranged in the approximately center portion of the respective heating blocks. Hereinafter, the thermistors T1 to T7 are referred to as the temperature control thermistors.

The thermistor T1*a*, T1*b*, and T2*a* to T5*a* are thermistors for detecting temperatures of the non-sheet passing areas when a recording material P narrower than the heat generation area in the longitudinal direction passes through. Hereinafter, the thermistors T1*a*, T1*b*, and T2*a* to T5*a* are referred to as the end-portion thermistors. Each of the end-portion thermistors is arranged at the outer portion of each heating block with respect to the conveyance reference position X0, except for the heating blocks (Z6 and Z7) on both the ends having narrower heat generation areas. Since the heating blocks Z6 and Z7 have narrower heat generation areas, no end-portion thermistors need to be arranged.

The thermistors t2 to t7 are sub-thermistors prepared for detecting a temperature in case of a failure of the temperature control thermistor or the end-portion thermistor. Hereinafter, the thermistors t2 to t7 are referred to as the sub-thermistors. The sub-thermistors t2 to t7 are arranged at positions approximately equivalent to the temperature control thermistors T2 to T7 in the longitudinal direction of the heater 70. One end of each of the temperature control thermistors T1 to T7 and the end-portion thermistors T1*a*, T1*b*, T2*a* to T5*a* is connected to the common conductor 78*a*, and another end of each of those is connected to the conductor 78*b* or 78*e*. One end of each of the sub-thermistors t2 to t7 is connected to the common conductor 78*c*, and another end of each of those is connected to the common conductor 78*d*. The conductors 78*a* to 78*d* extend to the ends of the heater 70 in the longitudinal direction.

As illustrated in FIG. 5D, the end portions of the conductors 78*a* to 78*d* in the longitudinal direction of the heater 70 are exposed, while the various thermistors and the other portions of conductors 78*a* to 78*d* are covered by the protective glass 81. The portions of the conductors exposed in the longitudinal direction of the heater 70 serve as the thermistor power supply electrodes 79*a* and 79*b*. These thermistor power supply electrodes 79*a* and 79*b* form a third electrode group.

The temperature of each heating block can be detected in detail and independently controlled by the heater circuit configuration described above. Therefore, the image fixing apparatus 13 capable of controlling the temperature with optimal and minimal energy without waste in accordance with the size of the fed recording material P can be provided. While the present embodiment has described the configuration in which the heater 70 includes the sub-thermistors, the present invention is not limited thereto. By including the sub-thermistors in the heater 70, more sophisticated and precise control can be achieved.

Figure 5E:
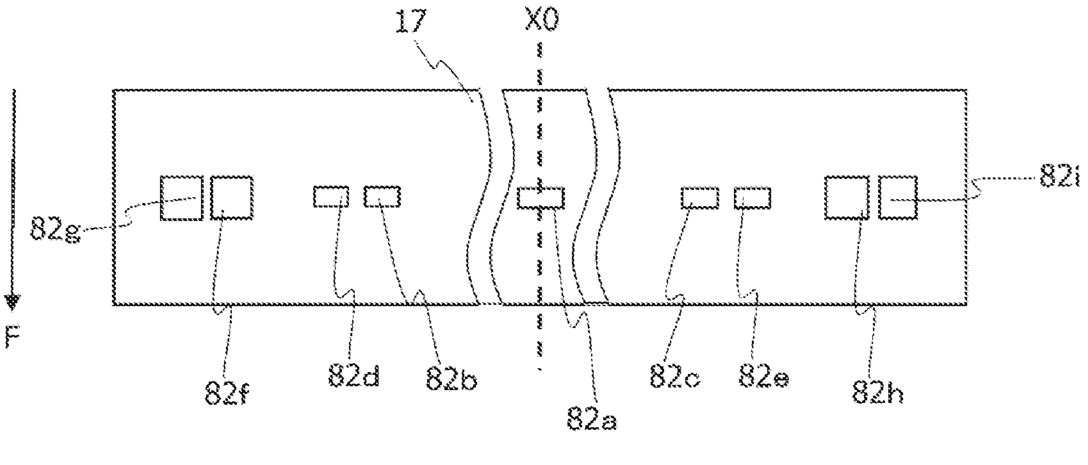

In addition, as illustrated in FIG. 5E, the heater holder 17 is provided with opening portions 82*a* to 82*i* for supplying power to the power supply electrodes 76*a* to 76*i*. The power supply unit supplying power to the power supply electrodes 76*a* to 76*e* is placed between the pressure stay 20 and the heater holder 17. Power is supplied to the power supply electrodes 76*f* to 76*i* arranged at the end portions of the heater 70 by using a connector type that creates a contact by applying pressure.

4. Configuration of Power Supply Unit

Figure 6A:
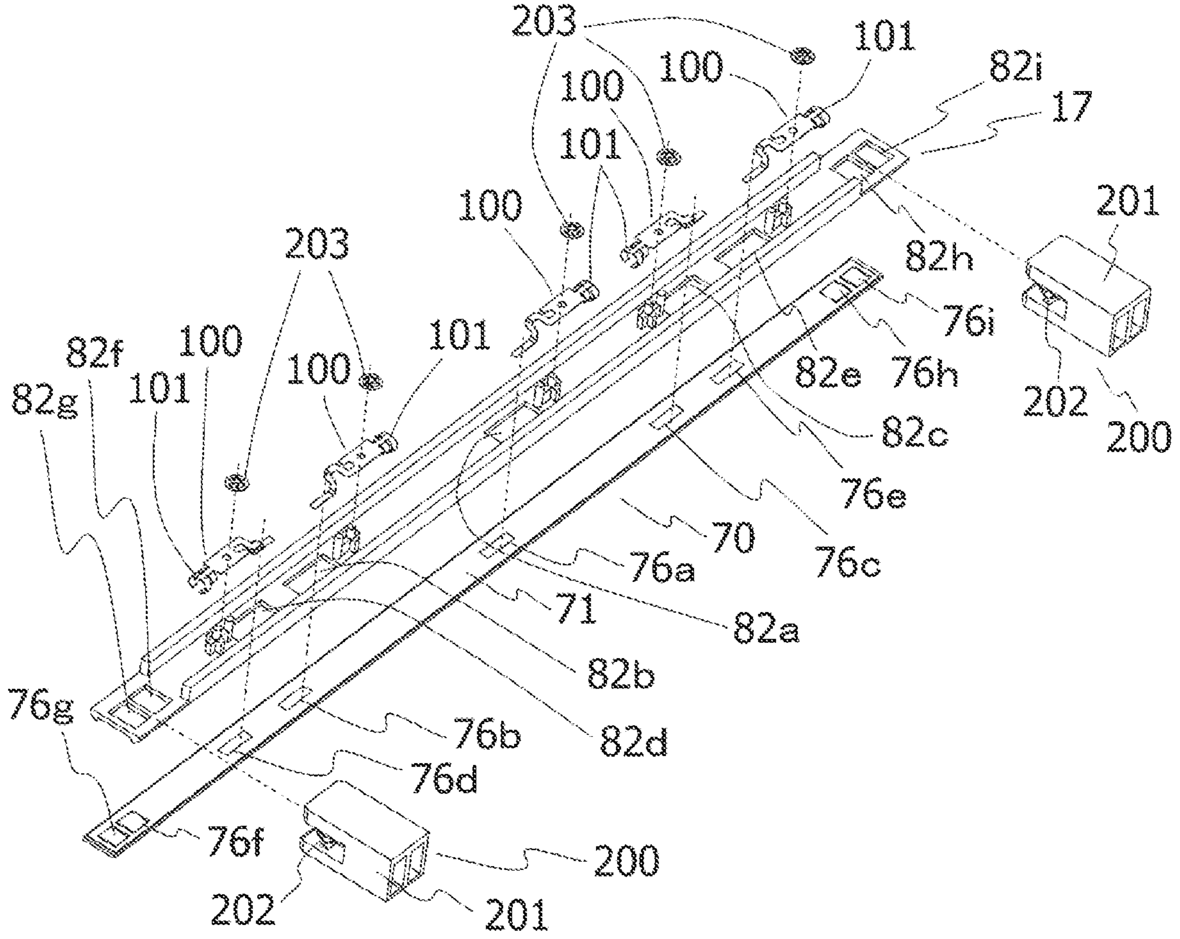
FIGS. 6A and 6B are overall views illustrating an example of the power supply unit according to Embodiment 1.
Figure 6B:
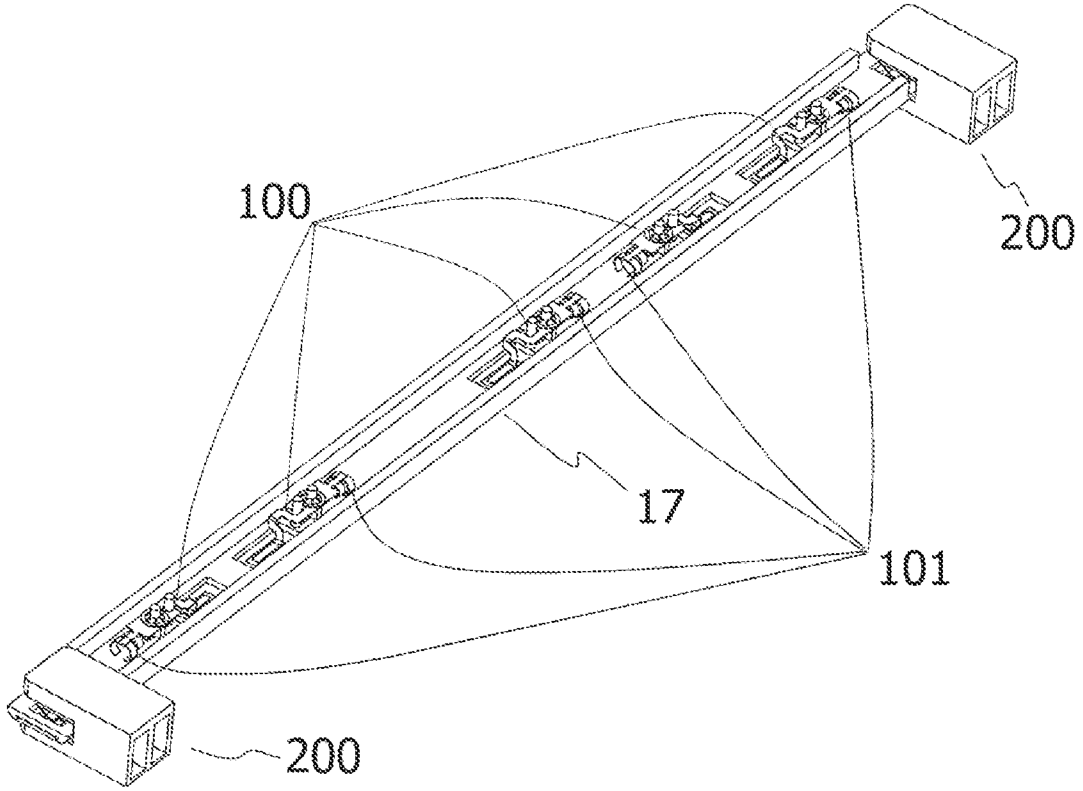

A configuration of the power supply unit according to the present embodiment will be described. FIGS. 6A and 6B are overall views illustrating an example of the power supply unit. As illustrated in FIG. 6A, the power supply unit is placed on the power supply electrodes 76*a* to 76*e* and includes a plurality of power supply members 100 electrically connected to the power supply electrodes 76*a* to 76*e* and connectors 200 that supply power to the power supply electrodes 76*f* to 76*i*. The power supply electrodes 76*a* to 76*e* and the respective power supply members 100 are bonded to each other on their surfaces, or the power supply electrodes 76*a* to 76*e* and the respective power supply members 100 are coupled to each other. As described above, the plurality of electrodes (power supply electrodes 76*a* to 76*i*) are provided on the substrate 71, and each of the plurality of power supply members 100 is electrically connected to each of the plurality of electrodes (power supply electrodes 76*a* to 76*e*). Each of the power supply members 100 is arranged such that the longitudinal direction of the power supply member 100 is approximately matched with the direction perpendicular to the conveying direction of the recording material P. A part of the power supply member 100 is fixed to the heater holder 17. In addition, a caulking portion 101 provided at the end portion of the power supply member 100 is swaged to hold a wire bundle (not illustrated) to be electrically connected, and power is thereby supplied from the wire bundle (not illustrated) to the caulking portion 101.

The connector 200 is a connector type that creates an electrical contact by applying pressure. Specifically, when the connector 200 is inserted from the short-side direction of the heater 70, a contact 202 provided in a housing 201 of the connector 200 is deformed by the thickness of the heater 70 so that the contact is created by the reaction force generated by the deformation of the contact 202. The connector 200 is also connected to the wire bundle (not illustrated) and supplied with power from the wire bundle (not illustrated). While the pressing force applied to the heater 70 is generated only by the contact 202 in the present embodiment, a spacer may be inserted on the sliding surface layer 72 side depending on the thickness of the heater 70. This makes the pressing force constant so that the reliability of the contact can be maintained.

FIG. 6B is an overall view of the assembled power supply unit. As described above, the power supply electrodes 76*a* to 76*e* and the respective power supply members 100 are electrically connected to each other via the opening portions 82*a* to 82*e* provided in the heater holder 17. Further, in the present embodiment, the two power supply members 100 adjacent to each other are arranged in different orientations. This enables the wire bundles (not illustrated) to be separated in the longitudinal direction so that the cross-sectional space of the pressure stay 20 and the heater holder 17 can be reduced, which is an advantage. In this way, the power supply unit can be placed in the smaller heating film 23. Further, the contacts 202 of the connectors 200 make contacts with the power supply electrodes 76*f* to 76*i* through the opening portions 82*f* to 82*i*. The wire bundles (not illustrated) extend outside the power supply unit from the short-side direction.

Figure 7A:
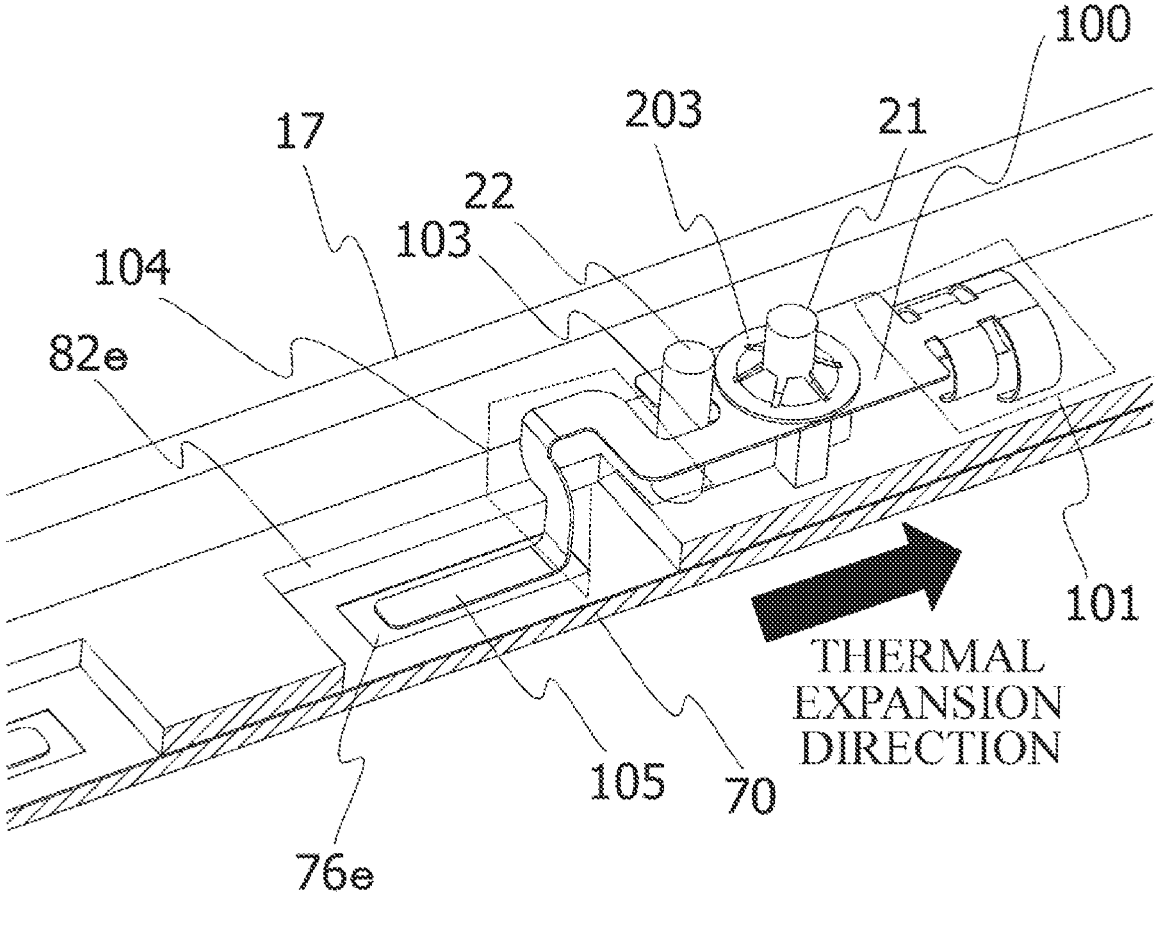
FIGS. 7A and 7B are cross-sectional perspective views in a longitudinal direction of the power supply unit according to Embodiment 1.
Figure 7B:
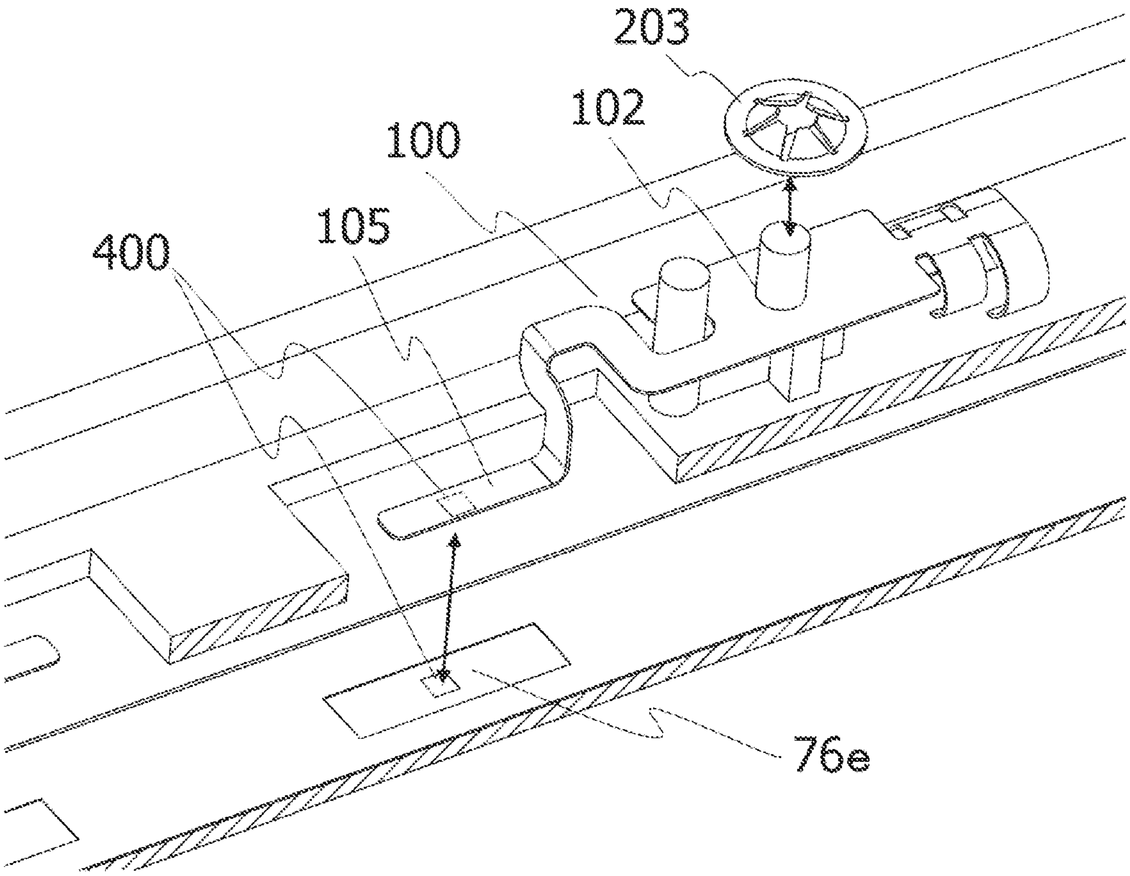

Next, the power supply unit bonded to the heater 70 will be described in detail with reference to FIGS. 7A and 7B. FIGS. 7A and 7B are cross-sectional perspective views in the longitudinal direction of the power supply unit. While a configuration of the power supply electrode 76*e* and the opening portion 82*e* will be described here, a similar configuration applies to each of the power supply electrodes 76*a* to 76*d* and the opening portions 82*a* to 82*d*. A positioning portion 102 and a rotation stopper portion 103 are formed on the power supply member 100. The positioning portion 102 fits a positioning boss 21 provided on the heater holder 17, and the rotation stopper portion 103 fits a rotation stopper boss 22 provided on the heater holder 17. The heater holder 17 is thereby positioned on the power supply member 100. As for a fixing method, the power supply member 100 is fixed to the heater holder 17 by attaching a push nut 203 to the positioning boss 21.

The power supply member 100 includes a deformation portion 104 and a joint portion 105. The deformation portion 104 serve to absorb a relative displacement difference between thermal expansion of the heater holder 17 and thermal expansion of the heater 70. Specifically, the heater holder 17 is made of heat-resistant resin, and the substrate 71 is made of ceramic material. The linear expansion coefficient of a heat-resistant resin is approximately 10 to $100\times10^{-6}/°$ C., and the linear expansion coefficient of a ceramic is approximately 0.1 to $10\times10^{-6}/°$ C. Since the stiffness of the heater 70 is dependent on the ceramic, which is a material of the substrate 71, the behavior of the heater 70 is equivalent to that of the ceramic.

The heater 70 generates heat by the electric power supplied via the power supply member 100, and an image (a toner image T) formed on the recording material P is heated by the heat of the heater 70. An operation related to the thermal expansion of the of the heater 70 is as follows. When the heating elements 74*a* and 74*b* are supplied with power and generate heat, the temperature of the heater 70 including the substrate 71 rises before the temperature of the heater holder 17 does. That is, at the early stage of the heat generation, the heater 70 is thermally expanded actively from the conveyance reference position X0 illustrated in FIGS. 5A to 5E being the center of the expansion, and the joint portion 105 side of the power supply member 100 moves in an arrow direction in FIG. 7A. This leads to a state in which the deformation portion 104 between the joint portion 105 and the positioning portion 102 of the power supply member 100 is stretched. Subsequently, the temperature of the heater holder 17 rises due to the heat generated by the heating elements 74*a* and 74*b*, and the heater holder 17 is also thermally expanded from the conveyance reference position X0 illustrated in FIGS. 5A to 5E being the center of the expansion.

Depending on the reaching point of the temperature rise of the heater holder 17, the displacement caused by the thermal expansion of the heater holder 17 becomes larger than that of the heater 70. Thus, when the displacement caused by the thermal expansion of the heater holder 17 is larger than that of the heater 70, the positioning boss 21 of the heater holder 17 is also displaced in the arrow direction in FIG. 7A. The deformation portion 104 between the joint portion 105 and the positioning portion 102 of the power supply member 100 is thereby stretched. In this way, the deformation portion 104 of the power supply member 100 absorbs a relative displacement difference between the thermal expansion of the heater holder 17 and the thermal expansion of the heater 70.

In addition, the joint portion 105 of the power supply member 100 and the power supply electrode 76*e* of the heater 70 are bonded or coupled to each other. Regarding the bonding and coupling, the power supply member 100 is arranged not to be in contact with the heating elements 74*a* and 74*b* of the heater 70. This can prevent the heat of the heating elements 74*a* and 74*b* from being taken by the power supply member 100 so that the occurrence of uneven fixing in the longitudinal direction can be reduced.

FIG. 7B illustrates an assembly method of the power supply unit described above. FIG. 7B illustrates the power supply electrode 76*e* in FIGS. 6A and 6B in detail. While a configuration of the power supply electrode 76*e* and the opening portion 82*e* will be described, a similar configuration applies to each of the power supply electrodes 76*a* to 76*d* and the opening portions 82*a* to 82*d*. First, the heater holder 17 is mounted on the heater 70 and adhered and fixed by a humidity-curing silicone-base adhesive. Next, the power supply member 100 is positioned by the positioning boss 21 and the rotation stopper boss 22 of the heater holder 17 and fixed by the push nut 203. Next, the joint portion 105 of the power supply member 100 and the power supply electrode 76*e* are ultrasonically bonded via the power supply member 100 to form a region 400. Alternatively, the joint portion 105 of the power supply member 100 and the power supply electrode 76*e* may be coupled to form a region 400. In this way, the joint portion 105 of the power supply member 100 and the power supply electrode 76*e* are electrically connected.

Figure 1A:
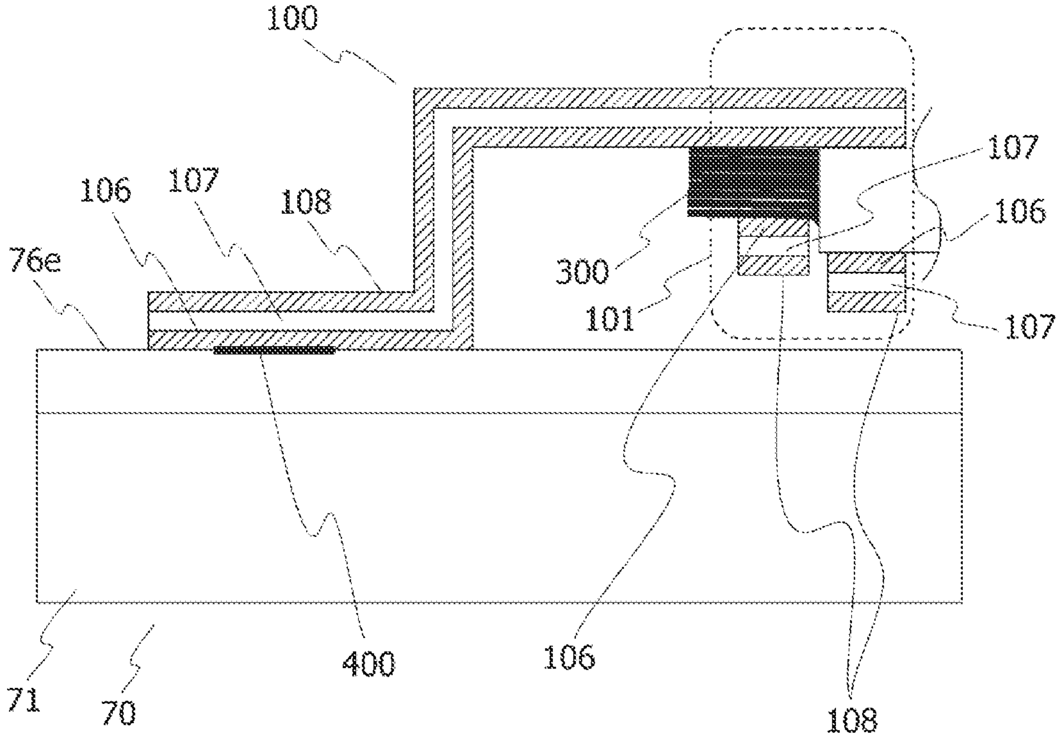
FIGS. 1A and 1B are cross-sectional views illustrating an example of a configuration of a power supply unit according to Embodiment 1.

Next, a cross-sectional configuration of the power supply unit will be described in detail with reference to FIG. 1A. FIG. 1A is a cross sectional view illustrating an example of a configuration of the power supply unit. While FIG. 1A illustrates a cross-sectional configuration of the power supply unit in the longitudinal direction, a similar configuration applies to a cross-sectional configuration of the power supply unit in the recording material conveying direction. First, the power supply member 100 includes three layers in a thickness direction. Specifically, the power supply member 100 includes a power supply layer 106 as a first member for supplying power to the heating elements 74*a* and 74*b*, a retention layer 107 as a second member, and a warp preventing layer 108 as a third member.

The power supply layer 106 is arranged on the power supply electrode 76*e* and electrically connected to the power supply electrode 76*e*. The power supply electrode 76*e* and the power supply layer 106 are bonded or coupled to each other. The retention layer 107 is arranged on the power supply layer 106 and electrically connected to the power supply layer 106. The retention layer 107 is bonded or coupled to a surface of the power supply layer 106 on an opposite side of the surface bonded or coupled to the power supply electrode 76*e*. The retention layer 107 is made of material whose linear expansion coefficient is different from that of the power supply layer 106. The warp preventing layer 108 is arranged on the retention layer 107 and electrically connected to the retention layer 107. The warp preventing layer 108 is bonded or coupled to a surface of the retention layer 107 on an opposite side of the surface bonded or coupled to the power supply layer 106. The warp preventing layer 108 is made of material whose linear expansion coefficient is the same as that of the power supply layer 106. That is, the warp preventing layer 108 is made of material whose linear expansion coefficient is different from that of the retention layer 107.

It is preferable that the power supply layer 106 be made of metal material having a high conductivity, such as copper or silver, to flow electricity. The surface in contact with a wire bundle 300 in the caulking portion 101 provided at the end portion of the power supply member 100 is formed to be the same surface as that of the power supply layer 106. This enables to share stable power supply without being affected by the conductivity of the retention layer 107. It is preferable that the retention layer 107 be made of material having a smaller linear expansion coefficient than that of the power supply layer 106. For example, the retention layer 107 is made of molybdenum, tungsten, or iron-nickel alloy. When the power supply layer 106 is made of copper or silver and the retention layer 107 is made of molybdenum, tungsten, or iron-nickel alloy, the thermal expansion coefficient of the retention layer 107 is smaller than that of the power supply layer 106.

The substrate 71 of the heater 70 is placed under the power supply electrode 76*e* bonded or coupled to the power supply layer 106. The amount of thermal expansion displacement of the power supply electrode 76*e* formed on the ceramic substrate 71 is equivalent to that of a ceramic. The linear expansion coefficient of silver is approximately $18.9\times10^{-6}/^{\circ}$ C., and the linear expansion coefficient of copper is approximately 16.5 to $16.8\times10^{-6}/^{\circ}$ C. When a metal material, such as copper or silver, or a metal material having a linear expansion coefficient equivalent to such a metal material is used as the power supply layer 106 of the power supply member 100, there is a large difference in linear expansion coefficient between the power supply layer 106 and the power supply electrode 76*e*. Consequently, a larger thermal stress repeatedly occurs in the power supply layer 106 and in the region 400 where the power supply layer 106 and the power supply electrode 76*e* are bonded or coupled. Thus, to reduce this difference in linear expansion coefficient, the thermal expansion of the power supply layer 106 is suppressed in the retention layer 107, which is bonded or coupled to the power supply layer 106, so that the repeated thermal stress that occurs in the region 400 and the power supply layer 106 can be reduced.

In addition, the warp preventing layer 108 bonded or coupled to the retention layer 107 is arranged for preventing the retention layer 107 from being deformed into a convex shape toward the lower side of FIG. 1A due to the application of the thermal stress when the power supply layer 106 and the retention layer 107 are bonded or coupled. That is, a condition in Embodiment 1 is that the linear expansion coefficient of the warp preventing layer 108 is larger than that of the retention layer 107. This prevents the warping of the power supply member 100 due to the thermal stress so that the stress that occurs in the power supply layer 106 and in the region 400 where the power supply layer 106 and the power supply electrode 76*e* are bonded or coupled can be further reduced. However, there is a case where the stress generated in the region 400 and the power supply layer 106 falls within an allowable value without having the warp preventing layer 108, depending on the linear expansion coefficient of each material and the situation of the rising temperature and the number of times of use.

By separating the functions of supplying power, reducing the thermal expansion, and preventing the warpage in the power supply member 100, the repeated thermal stress that occurs in the region 400 where the power supply layer 106 and the power supply electrode 76*e* are bonded or coupled can be reduced so that the reliability of the power supply member 100 can be improved. Furthermore, in view of adjusting the linear expansion coefficient of the material of the substrate 71 and ensuring conduction performance, the thickness of each layer of the power supply member 100 is adjusted so that both the reduction of the repeated thermal stress and the improvement of the reliability of the power supply member 100 can be achieved.

In addition, since the power supply member 100 is used in a high-temperature environment, there is a case where oxidation of the power supply member 100 needs to be prevented. Within the range that does not affect the linear expansion coefficient adjusted for each layer of the power supply member 100, processing such as nickel plating or gold plating may be performed on the power supply member to prevent oxidation.

As for the assembly method, while the present embodiment uses the ultrasonic bonding to join the power supply member 100 and the power supply electrode 76*e*, the assembly method is not limited thereto. As long as the two members (the power supply member 100 and the power supply electrode 76*e*) are connected without being detached from each other, the two members may be bonded to each other on their plane surfaces, or the two members may be coupled intricately. The power supply electrode 76*e* and the power supply layer 106 may have plane surfaces opposed to each other. In this case, the plane surface of the power supply electrode 76*e* and the plane surface of the power supply layer 106 may be bonded to each other. The power supply layer 106 and the retention layer 107 may have plane surfaces opposed to each other. In this case, the plane surface of the power supply layer 106 and the plane surface of the retention layer 107 may be bonded to each other. The retention layer 107 and the warp preventing layer 108 may have plane surfaces opposed to each other. In this case, the plane surface of the retention layer 107 and the plane surface of the warp preventing layer 108 may be bonded to each other.

The bonding in the present embodiment includes diffusion bonding, solid phase bonding, fusion welding, pressure bonding, brazing, and boding by a conductive adhesive. It is preferrable that a brazing material used for brazing and a conductive adhesive are sufficiently thin with respect to the thickness of the power supply member 100 so as not to affect the difference in linear expansion coefficient between the power supply member 100 and the power supply electrode 76*e*. Further, the coupling in the present embodiment includes press fitting, shrink fitting, caulking, etc. For example, any one of the above bonding methods and the coupling methods may be used, as long as the power supply layer 106, the retention layer 107, and the warp preventing layer 108 of the power supply member 100 are joined together without being detached from each other. A clad material obtained by rolling each layer of the power supply member 100 to be diffusion-bonded by a heat treatment may be used. For example, the power supply layer 106 and the retention layer 107 may be made of two-layered clad material, the retention layer 107 and the warp preventing layer 108 may be made of two-layered clad material, or the power supply layer 106, the retention layer 107, and the warp preventing layer 108 may be made of three-layered clad material.

Any one of the above bonding methods and the coupling methods may be used, as long as the bonding area or the coupling area between the power supply layer 106 and the retention layer 107 or between the retention layer 107 and the warp preventing layer 108 is larger than or equal to the area of the region 400. With such configurations and within the area of the region 400 where the power supply layer 106 and the power supply electrode 76*e* are bonded or coupled, the thermal expansion of the power supply layer 106 is suppressed by the retention layer 107, and the repeated thermal stress can thus be reduced.

Figure 1B:
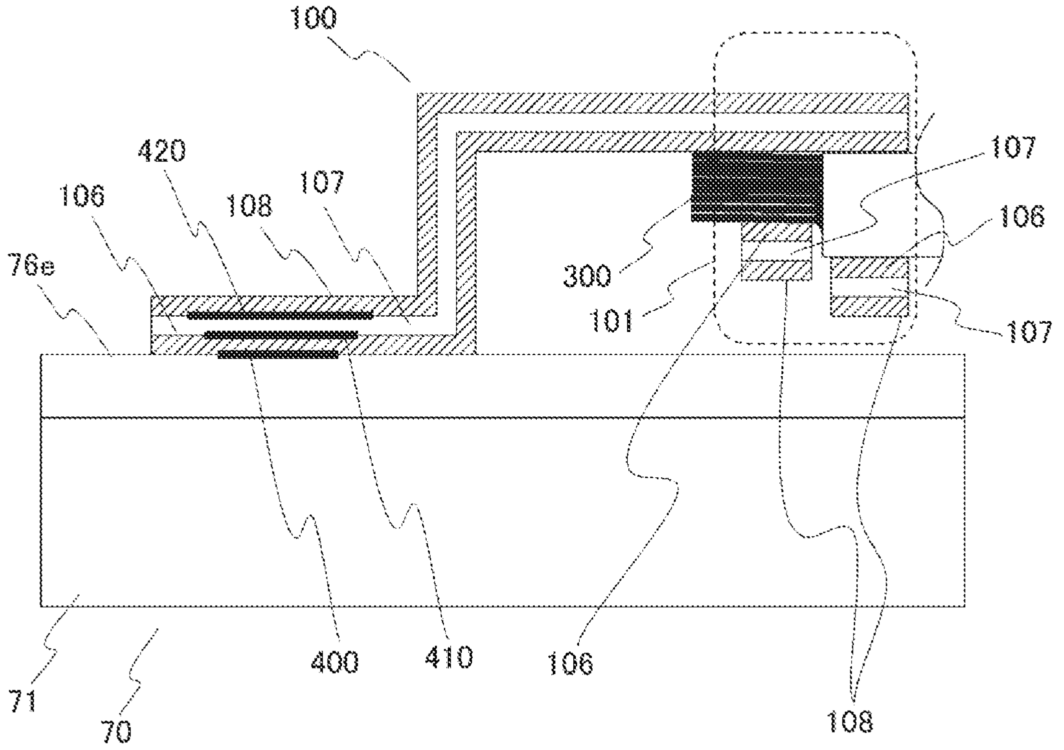

FIG. 1B illustrates an example of a cross-sectional configuration of the power supply unit. The region 400 as a first region where the power supply electrode 76*e* and the power supply layer 106 are bonded or coupled and a region 410 as a second region where the power supply layer 106 and the retention layer 107 are bonded or coupled are projected on the surface of the substrate 71. In this case, the outer periphery of the region 400 may be located on the inner side of the outer periphery of the region 410. Unlike the configuration illustrated in FIG. 1B, when the regions 400 and 410 are projected on the surface of the substrate 71, the outer periphery of the region 400 and the outer periphery of the region 410 may be matched. Further, when the regions 400 and 410 are projected on the surface of the substrate 71, a part of the region 400 and a part of the region 410 may be arranged so as not to overlap with each other.

When the region 400, the region 410, and a region 420 as a third region where the retention layer 107 and the warp preventing layer 108 are bonded or coupled are projected on the surface of the substrate 71, the outer periphery of the region 400 may be located on the inner side of the outer periphery of the region 410, and the outer periphery of the region 410 may be located on the inner side of the outer periphery of the region 420. Unlike the configuration illustrated in FIG. 1B, when the regions 400, 410, and 420 are projected on the surface of the substrate 71, the outer periphery of the region 400 and the outer periphery of the region 410 may be matched, and the outer periphery of the region 410 may be located on the inner side of the outer periphery of the region 420. Further, when the regions 400, 410, and 420 are projected on the surface of the substrate 71, the outer periphery of the region 400 may be located on the inner side of the outer periphery of the region 410, and the outer periphery of the region 410 and the outer periphery of the region 420 may be matched. When the regions 400, 410, and 420 are projected on the surface of the substrate 71, the outer periphery of the region 400, the outer periphery of the region 410, and the outer periphery of the region 420 may be matched. When the regions 400 and 420 are projected on the surface of the substrate 71, a part of the region 400 and a part of the region 420 may be arranged so as not to overlap with each other. When the regions 410 and 420 are projected on the surface of the substrate 71, a part of the region 410 and a part of the region 420 may be arranged so as not to overlap with each other.

Figure 8:
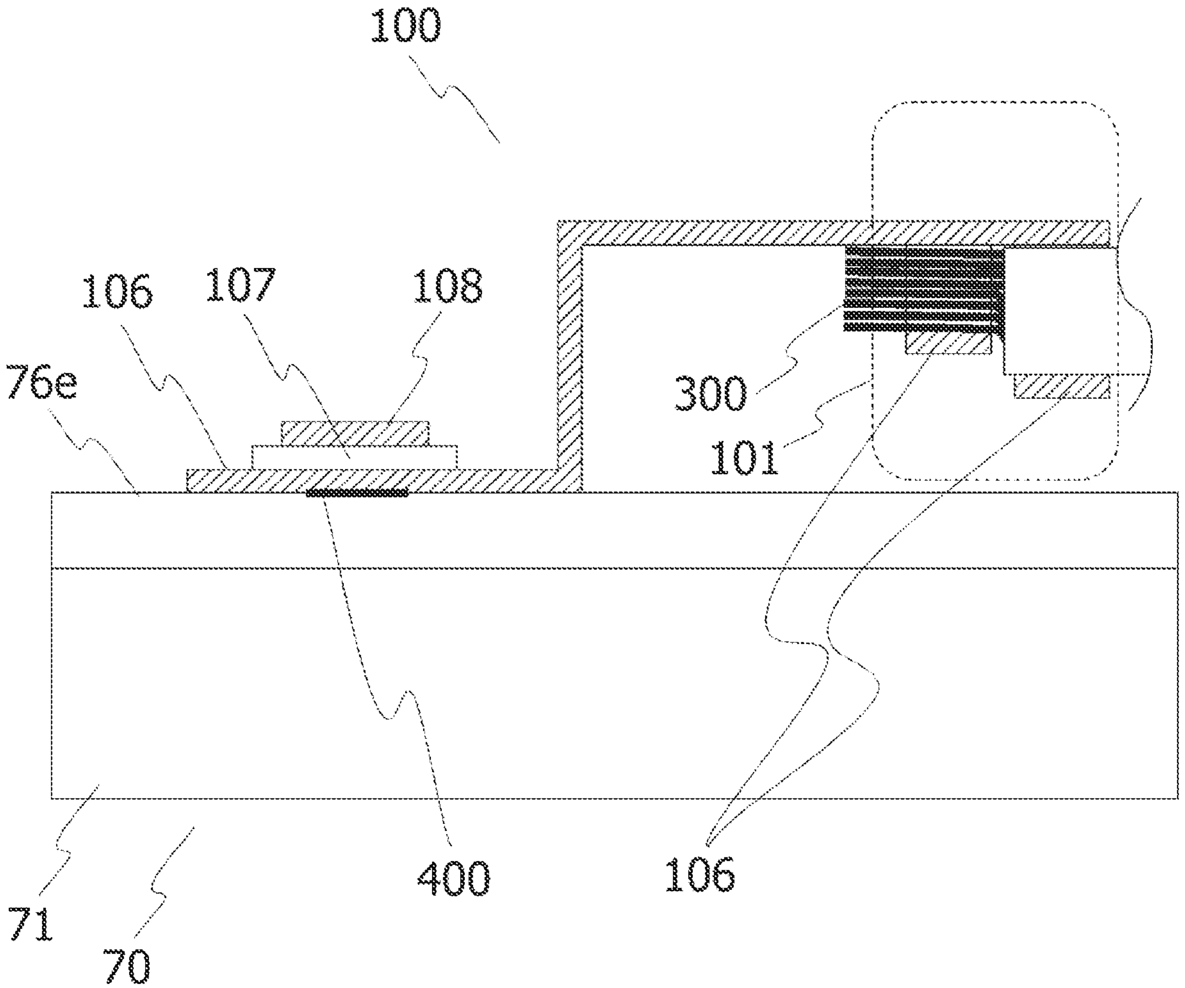
FIG. 8 is a cross-sectional view illustrating an example of a configuration of another power supply unit according to Embodiment 1.

FIG. 8 is a cross-sectional view illustrating an example of a configuration of another power supply unit. In FIG. 8, the whole area where the power supply layer 106 and the retention layer 107 are in contact with each other is a bonding region or a coupling region, and the whole area where the retention layer 107 and the warp preventing layer 108 are in contact with each other is a boding region or a coupling region. An area of the bonding region or an area of the coupling region between the power supply layer 106 and the retention layer 107 or between the retention layer 107 and the warp preventing layer 108 is larger than an area of the region 400 where the power supply layer 106 and the power supply electrode 76*e* are bonded or coupled. In FIG. 8, the area of the region where the power supply layer 106 and the retention layer 107 are in contact with each other is larger than the area of the region where the retention layer 107 and the warp preventing layer 108 are in contact with each other. However, the present invention is not limited to the configuration illustrated in FIG. 8. An area of the region where the power supply layer 106 and the retention layer 107 are in contact with each other may be equal to an area of the region where the retention layer 107 and the warp preventing layer 108 are in contact with each other.

In the present embodiment, the substrate 71 of the heater 70 is made of ceramic material. However, the substrate 71 may be made of metal material such as stainless steel or a heat-resistant resin such as PEEK. That is, any material that is resistant to the heating temperature of the heater 70 may be used. A similar effect can be obtained by selecting an optimal linear expansion coefficient for each of the power supply layer 106, the retention layer 107, and the warp preventing layer 108 in accordance with the material of the substrate 71 to reduce the thermal stress that occurs in the region 400 where the power supply member 100 and the power supply electrode 76*e* are bonded or coupled.

Embodiment 2

Next, a configuration of a power supply unit of Embodiment 2 will be described. Components with like configurations and functions as those of Embodiment 1 are denoted by like reference characters, and descriptions thereof will be omitted. A configuration of a heater 70 of Embodiment 2 is the same as that of Embodiment 1 and is as illustrated in FIGS. 5A to 5E.

Figure 9A:
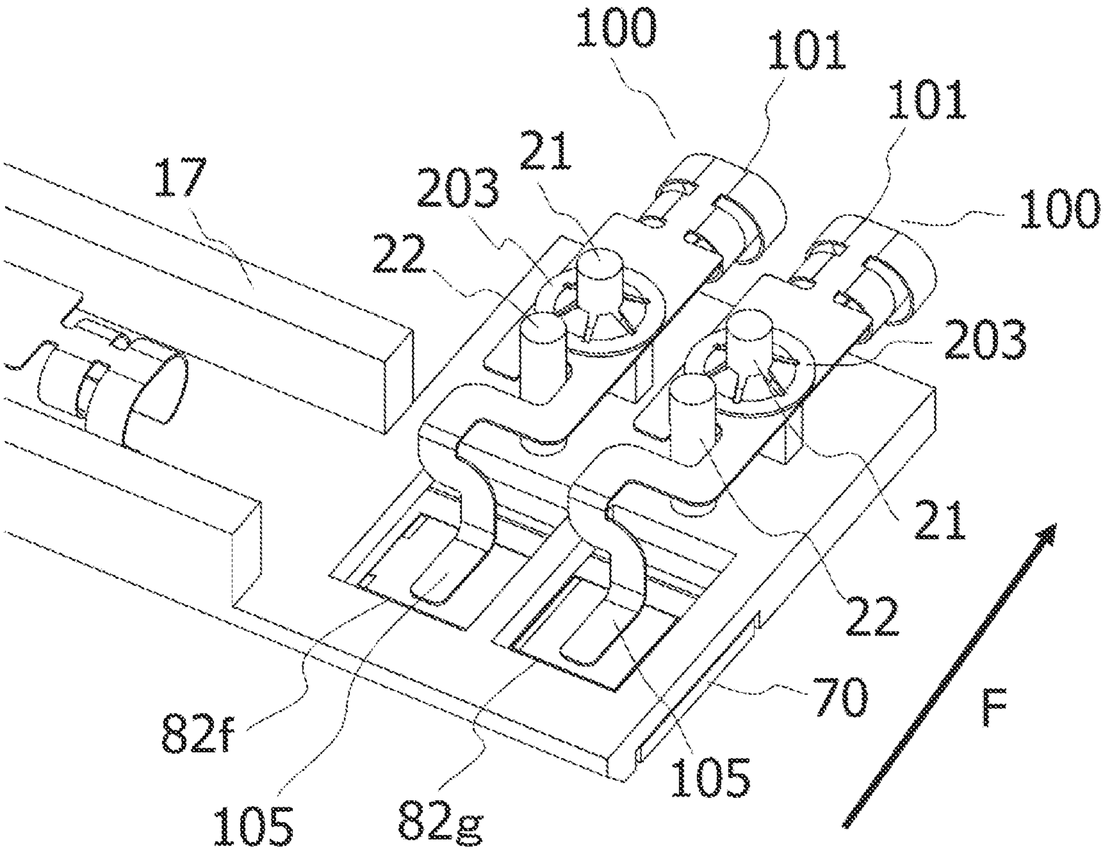
FIGS. 9A and 9B are perspective views illustrating an example of a power supply unit according to Embodiment 2.
Figure 9B:
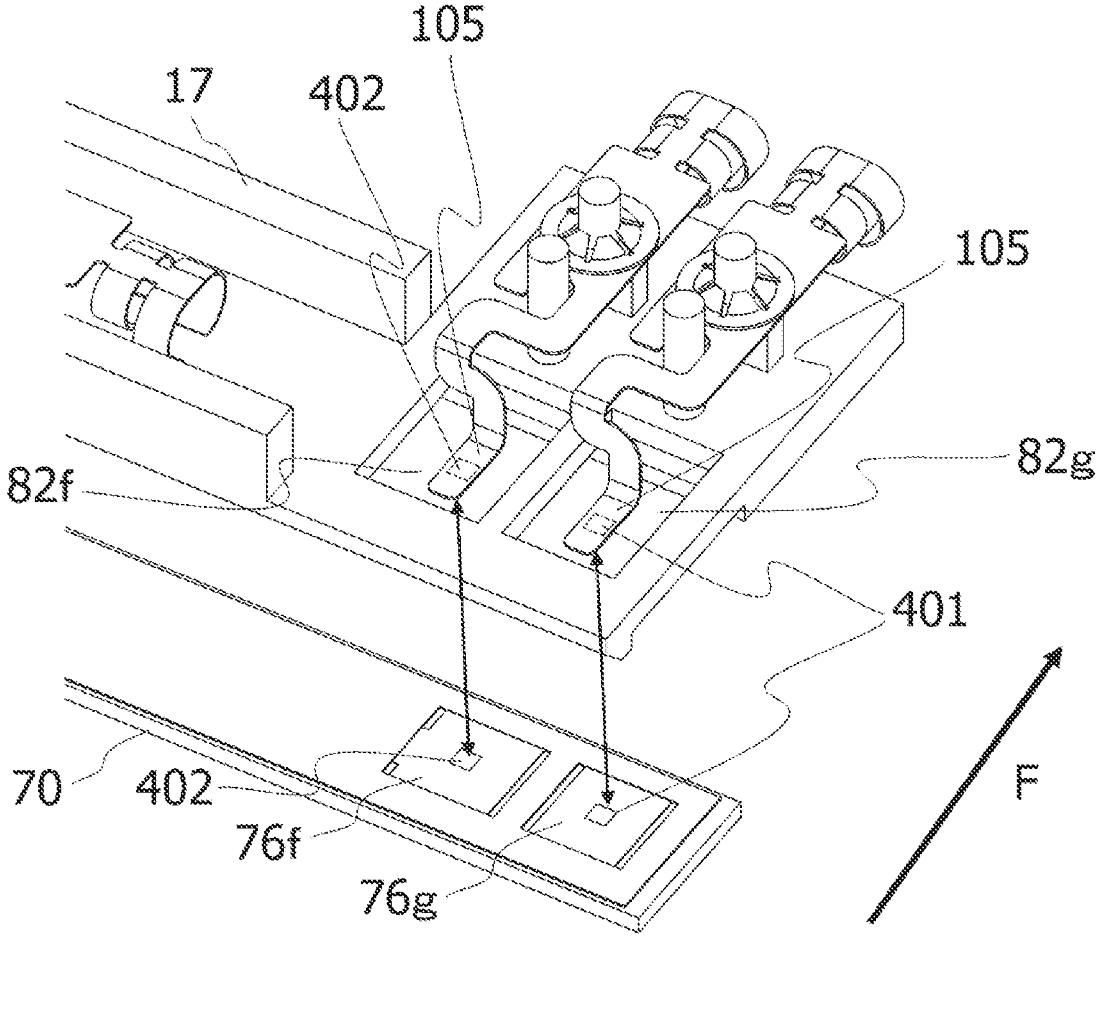

In the present embodiment, the configuration of the power supply unit of Embodiment 1 is applied to power supply electrodes 76*f* to 76*i*. FIGS. 9A and 9B are perspective views illustrating an example of the power supply unit. FIGS. 9A and 9B illustrate a configuration of the power supply electrodes 76*f* and 76*g* in Embodiment 2. A configuration of the power supply electrodes 76*h* and 76*i* is the same as that of the power supply electrodes 76*f* and 76*g*, and descriptions thereof will thus be omitted. As illustrated in FIG. 9A, a power supply member 100 is positioned by a heater holder 17. As for a fixing method, the power supply member 100 is fixed to the heater holder 17 by attaching a push nut 203 to a positioning boss 21. An arrow direction F in FIGS. 9A and 9B indicates a conveying direction of a recording material P.

In addition, a caulking portion 101 of the power supply member 100 is swaged to hold a wire bundle (not illustrated), and the wire bundle extends in the conveying direction of the recording material P. Unlike Embodiment 1, the power supply member 100 is arranged such that the longitudinal direction of the power supply member 100 is approximately matched to the conveying direction of the recording material P so that further downsizing of an image fixing apparatus 13 in a direction perpendicular to the conveying direction of the recording material P can be achieved.

Next, a joining mode of the power supply unit of Embodiment 2 will be described with reference to FIG. 9B. The power supply electrodes 76*f* and 76*g* are bonded to respective joint portions 105 of the power supply members 100 by ultrasonic bonding to form regions 401 and 402. Alternatively, the power supply electrodes 76*f* and 76*g* may be coupled to respective joint portions 105 of the power supply members 100 to form regions 401 and 402. In this way, the power supply electrodes 76*f* and 76*g* and the respective joint portions 105 of the power supply members 100 are electrically connected.

In the present embodiment, instead of using the connector 200 described in Embodiment 1, power is supplied to the power supply electrodes 76*f* to 76*i* by using the respective power supply members 100. The configuration according to Embodiment 2 can reduce the costs, compared to the configuration using the connector 200 according to Embodiment 1. The contact 202 of the connector 200 ensures a contact with each of the power supply electrodes 76*f* to 76*i* by applying pressure. There are cases where a component made of a gold-plated titanium-copper alloy is used as a contact 202 to generate a pressing force in a high-temperature environment and ensure the conductivity of the contact. By using the power supply member 100 in place of such a connector 200 and appropriately selecting the material of the power supply member 100, the costs can be reduced. Furthermore, even when the downsizing of the image fixing apparatus 13 causes the vicinities of the power supply electrodes 76*f* to 76*i*, which are non-heat-generating portions, to be more easily affected by the temperature of the heater 70, the configuration of the present embodiment can reduce the thermal expansion stress that occurs in the regions 401 and 402. Thus, the reliability of the power supply member 100 can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-091436, filed on May 26, 2020, which is hereby incorporated by reference herein in its entirety.

What is claimed is:

1. A fixing apparatus for fixing an image formed on a recording material to the recording material, the fixing apparatus comprising:

a tubular film contacting the recording material;

a heater located in an inner space of the film, the heater including a substrate, a plurality of heating elements arranged on the substrate along a longitudinal direction of the substrate, and a plurality of electrodes provided on the substrate, each electrically connected to a corresponding one of the plurality of heating elements; and a plurality of electrical contacts, located in the inner space of the film, each including a contact portion contacting the electrode corresponding to one of the plurality of heating elements and a caulking portion caulking a wire bundle through which electrical current flows, wherein with respect to the longitudinal direction of the substrate, the plurality of electrodes includes a first electrode, a second electrode located next to the first electrode, and a third electrode corresponding to the heating element located at a position containing a conveyance reference position for the recording material in the longitudinal direction of the substrate, wherein the plurality of electrical contacts includes a first electrical contact contacting the first electrode and a second electrical contact contacting the second electrode, wherein with respect to the longitudinal direction, the first electrical contact and the second electrical contact are arranged so that the contact portion of the first electrical contact and the contact portion of the second electrical contact face each other, and the caulking portion of the first electrical contact and the caulking portion of the second electrical contact do not face each other, and wherein the first electrode and the second electrode are the electrodes corresponding to the heating elements located away from the conveyance reference position in the longitudinal direction of the substrate.

2. A fixing apparatus according to claim 1, wherein with respect to the longitudinal direction of the substrate, a width of the heating element corresponding to the first electrode is less than a width of the heating element corresponding to the third electrode, and a width of the heating element corresponding to the second electrode is less than the width of the heating element corresponding to the third electrode.

3. A fixing apparatus according to claim 1, further comprising a roller contacting an outer surface of the film, wherein a nip portion through which the recording material passes is formed between the film and the roller by nipping the film between the heater and the roller, and wherein the plurality of the electrodes is located in the inner space of the film.

* * * * *